(12) United States Patent
Shine et al.

(10) Patent No.: US 11,456,645 B2
(45) Date of Patent: Sep. 27, 2022

(54) SYSTEM AND METHOD FOR OPERATING AN ASYNCHRONOUS INVERTER-BASED RESOURCE AS A VIRTUAL SYNCHRONOUS MACHINE WITH STORAGE

(71) Applicant: General Electric Renovables Espana, S.L., Barcelona (ES)

(72) Inventors: Shan Shine, Bangalore (IN); Kapil Jha, Bangalore (IN); Veena Padmarao, Bangalore (IN); Arvind Kumar Tiwari, Niskayuna, NY (US); Subbarao Tatikonda, Bangalore (IN); Werner Gerhard Barton, Rheine (DE)

(73) Assignee: General Electric Renovables Espana, S.L., Barcelona (ES)

( * ) Notice: Subject to any disclaimer, the term of this patent is extended or adjusted under 35 U.S.C. 154(b) by 20 days.

(21) Appl. No.: 17/117,613

(22) Filed: Dec. 10, 2020

(65) Prior Publication Data

US 2022/0190681 A1 Jun. 16, 2022

(51) Int. Cl.
*H02K 7/18* (2006.01)
*H02P 9/00* (2006.01)
(Continued)

(52) U.S. Cl.
CPC .............. *H02K 7/183* (2013.01); *H02J 3/381* (2013.01); *H02P 9/007* (2013.01); *H02P 27/06* (2013.01);
(Continued)

(58) Field of Classification Search
CPC ...... H02K 7/183; H02J 3/381; H02J 2300/28; H02J 2300/22; H02P 9/007; H02P 27/06
See application file for complete search history.

(56) References Cited

U.S. PATENT DOCUMENTS 5,798,633 A 8/1998 Larsen et al.
7,119,452 B2 10/2006 Larsen
(Continued)

FOREIGN PATENT DOCUMENTS

CN 109494709 A 3/2019
CN 110048457 A 7/2019
(Continued)

OTHER PUBLICATIONS

Huang et al., Synchronization and Frequency Regulation of DFIG-Based Wind Turbine Generators with Synchronized Control, IEEE Transactions on Energy Conversion, vol. 32, Issue 3, Sep. 2017, pp. 1251-1262. (Abstract Only).
(Continued)

*Primary Examiner* — Sean Gugger
(74) *Attorney, Agent, or Firm* — Dority & Manning, P.A.

(57) ABSTRACT

A method for controlling an inverter-based resource having an asynchronous machine connected to a power grid to provide grid-forming control of the inverter-based resource includes coupling at least one additional device to terminals of a first converter of the inverter-based resource. Further, the method includes emulating, via a controller, at least one of the at least one additional device or the first converter as a first virtual synchronous machine. Moreover, the method includes coordinating, via the controller, operation of the first virtual synchronous machine and a second converter of the inverter-based resource using a vector-control approach to control at least one of voltage and frequency at a point of interconnection between the inverter-based resource and the power grid in a closed loop manner.

20 Claims, 20 Drawing Sheets

(51) Int. Cl.
*H02P 27/06* (2006.01)
*H02J 3/38* (2006.01)
(52) U.S. Cl.
CPC ....... *H02J 2300/22* (2020.01); *H02J 2300/28* (2020.01)

(56) References Cited

U.S. PATENT DOCUMENTS

| | | | |
|---|---|---|---|
| 7,804,184 | B2 | 9/2010 | Yuan et al. |
| 8,880,236 | B2 | 11/2014 | Weiss et al. |
| 9,270,194 | B2 | 2/2016 | Brogan et al. |
| 9,300,142 | B2 | 3/2016 | Tarnowski |
| 9,660,452 | B2 | 5/2017 | Routimo |
| 9,660,453 | B2 | 5/2017 | Majumder |
| 10,156,225 | B2 | 12/2018 | Huang et al. |
| 10,305,283 | B1 | 5/2019 | Larsen |
| 10,320,192 | B2 | 6/2019 | Bamberger et al. |
| 10,389,129 | B2 | 8/2019 | Harnefors et al. |
| 10,651,771 | B2 | 5/2020 | Zhong |
| 2010/0142237 | A1* | 6/2010 | Yuan ............... H02J 3/381 363/97 |
| 2014/0307488 | A1* | 10/2014 | Brogan ............ H02J 3/50 363/35 |
| 2014/0316604 | A1 | 10/2014 | Ortjohann et al. |
| 2018/0191281 | A1 | 7/2018 | Zhong |
| 2018/0269819 | A1 | 9/2018 | Tuckey et al. |
| 2019/0386593 | A1* | 12/2019 | Zhong ............... H02P 21/0003 |

FOREIGN PATENT DOCUMENTS

| | | |
|---|---|---|
| CN | 111654062 A | 9/2020 |
| EP | 2523298 B1 | 11/2012 |
| EP | 2792042 B1 | 2/2016 |
| EP | 3533996 A1 | 9/2019 |
| WO | WO2015/131958 A1 | 9/2015 |
| WO | WO2017/069746 A1 | 4/2017 |
| WO | WO2019/149561 A1 | 8/2019 |
| WO | WO2020/043306 A1 | 3/2020 |
| WO | WO2020/052937 A1 | 3/2020 |
| WO | WO2020/135904 A1 | 7/2020 |
| WO | WO2020/135905 A1 | 7/2020 |
| WO | WO2020/221546 A1 | 11/2020 |

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

Nian et al., Improved Virtual Synchronous Generator Control of DIFG to Ride-Through Symmetrical Voltage Fault, IEEE Transactions on Energy Conversion, vol. 35, Issue 2, Jun. 2020, pp. 672-683. (Abstract Only).

Wang et al., On Inertial Dynamics of Virtual-Synchronous-Controlled DFIG-Based Wind Turbines, IEEE Transactions on Energy Conversion, vol. 30, Issue 4, Dec. 2015, pp. 1691-1702. (Abstract Only).

Wang et al., Virtual Synchronous Control for Grid-Connected DFIG-Based Wind Turbines, IEEE Journal of Emerging and Selected Topics in Power Electronics, vol. 3, Issue 4, Dec. 2015, pp. 932-944. (Abstract Only).

Extended European Search Report for EP application No. 21211700.6, dated of May 6, 2022.

Mohseni, Mansour, Enhanced Hysteresis-Based Current Regulators in Vector Control of DFIG Wind Turbines, IEEE Transactions on Power Electronics, IEEE USA, vol. 26, No. 1, Jan. 1, 2011, pp. 223-234.

* cited by examiner

SYSTEM AND METHOD FOR OPERATING AN ASYNCHRONOUS INVERTER-BASED RESOURCE AS A VIRTUAL SYNCHRONOUS MACHINE WITH STORAGE

FIELD

The present disclosure relates generally to inverter-based resources, such as wind turbine power systems and more particularly, to systems and methods for operating grid-connected inverter-based resources having an asynchronous machine as a virtual synchronous machine to provide grid-forming control of the inverter-based resource.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to asynchronous machines, which determine the grid defining parameters voltage and frequency, have contributed to decreasing stability margins. The immediate consequence of the decreased stability margins is a grid collapse when subjected to voltage and frequency disturbances in the grid.

Accordingly, many existing asynchronous machines, such as doubly-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following doubly-fed wind turbine generator. As shown, the active power reference to the converter is developed by the energy source regulator, e.g. the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the doubly-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g. Vref and Pref) and limits (e.g. VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g. VcnvCmd) and angle (e.g. $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

Accordingly, the present disclosure is directed to systems and methods for operating grid-connected inverter-based resources having an asynchronous machine as a virtual synchronous machine to provide grid-forming control of the inverter-based resource so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource having an asynchronous machine connected to a power grid to provide grid-forming control of the inverter-based resource. The inverter-based resource has a first converter and a second converter. For example, in an embodiment, the asynchronous machine may be a doubly-fed induction generator, whereas the inverter-based resource may be a wind turbine power system. In such embodiments, the first converter may be a line-side converter and the second converter may be a rotor-side converter of the wind turbine power system. Accordingly, the method includes coupling at least one additional device to terminals of the first converter. Further, the method includes emulating, via a controller, at least one of the at least one additional device or the first converter as a first virtual synchronous machine. Moreover, the method includes coordinating, via the controller, operation of the first virtual synchronous machine and the second converter using a vector-control approach to control at least one of voltage and frequency at a point of interconnection between the inverter-based resource and the power grid in a closed loop manner.

In an embodiment, the additional device(s) may include a storage device. In another embodiment, the additional device(s) may also include an additional hybrid power source. For example, the hybrid power source may include a solar power source, a wind power source, a hydropower source, an energy storage device, or similar.

In further embodiments, the method may include emulating the second converter and the asynchronous machine as a second virtual synchronous machine connected in parallel to the first virtual synchronous machine.

In additional embodiments, coordinating the operation of the first virtual synchronous machine and the second converter using the vector-control approach to control at least one of the voltage and the frequency at the point of interconnection between the inverter-based resource and the power grid in the closed loop manner may include, for example, incorporating a droop characteristic into voltage and frequency control loops of the first and second converters to coordinate operation of the first and second virtual synchronous machines using the vector-control approach to control at least one of the voltage and the frequency at the point of interconnection between the inverter-based resource and the power grid in the closed loop manner.

In yet another embodiment, the additional device(s) may include a reactive power compensation device. In such embodiments, emulating at least one of the additional device (s) or the first converter as the first virtual synchronous machine may include emulating the reactive power compensation device as the first virtual synchronous machine. Further, in such embodiments, the first virtual synchronous machine may be a vector-control-based synchronous machine.

Moreover, in such embodiments, the reactive power compensation device may include at least one storage device. In alternative embodiments, the reactive power compensation device may be absent of storage.

In several embodiments, the method may further include receiving, via the controller, at least one of a frequency reference command or a voltage reference command from an external controller, determining, via the controller, at least one power reference signal for the inverter-based resource based on at least one of the frequency reference command or the voltage reference command, generating, via the controller, at least one current vector using the at least one power reference signal, determining, via the controller, one or more voltage control commands for the inverter-based resource using the at least one current vector, and controlling, via the controller, the inverter-based resource based on the one or more voltage control commands such that the inverter-based resource actively participates in controlling at least one of the voltage and the frequency at the point of interconnection between the inverter-based resource and the power grid in the closed loop manner.

In particular embodiments, the controller may be a turbine controller or a converter controller of the wind turbine power system.

In another aspect, the present disclosure is directed to an inverter-based resource connected to a power grid. The inverter-based resource may include an asynchronous machine, a first converter, a second converter, at least one additional device to terminals of the first converter, and at least one controller for operating the inverter-based resource to provide grid-forming control thereof. The controller includes at least one processor configured to perform a plurality of operations, including but not limited to, emulating at least one of the at least one additional device or the first converter as a first virtual synchronous machine and coordinating operation of the first virtual synchronous machine and the second converter using a vector-control approach to control at least one of voltage and frequency at a point of interconnection between the at least one inverter-based resource and the power grid in a closed loop manner. It should be understood that the inverter-based resource may further include any of the additional features and/or steps described herein.

In yet another aspect, the present disclosure is directed to a wind turbine power system connected to a power grid. The wind turbine power system includes a power converter having a rotor-side converter and a line-side converter, a doubly-fed induction generator, at least one additional device to terminals of the line-side converter, and at least one controller for operating the wind turbine power system to provide grid-forming control of the wind turbine power system. The controller includes at least one processor configured to perform a plurality of operations, including but not limited to, emulating at least one of the at least one additional device or the line-side converter as a first virtual synchronous machine and coordinating operation of the first virtual synchronous machine and the rotor-side converter using a vector-control approach to control at least one of voltage and frequency at a point of interconnection between the wind turbine power system and the power grid in a closed loop manner. It should be understood that the wind turbine power system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
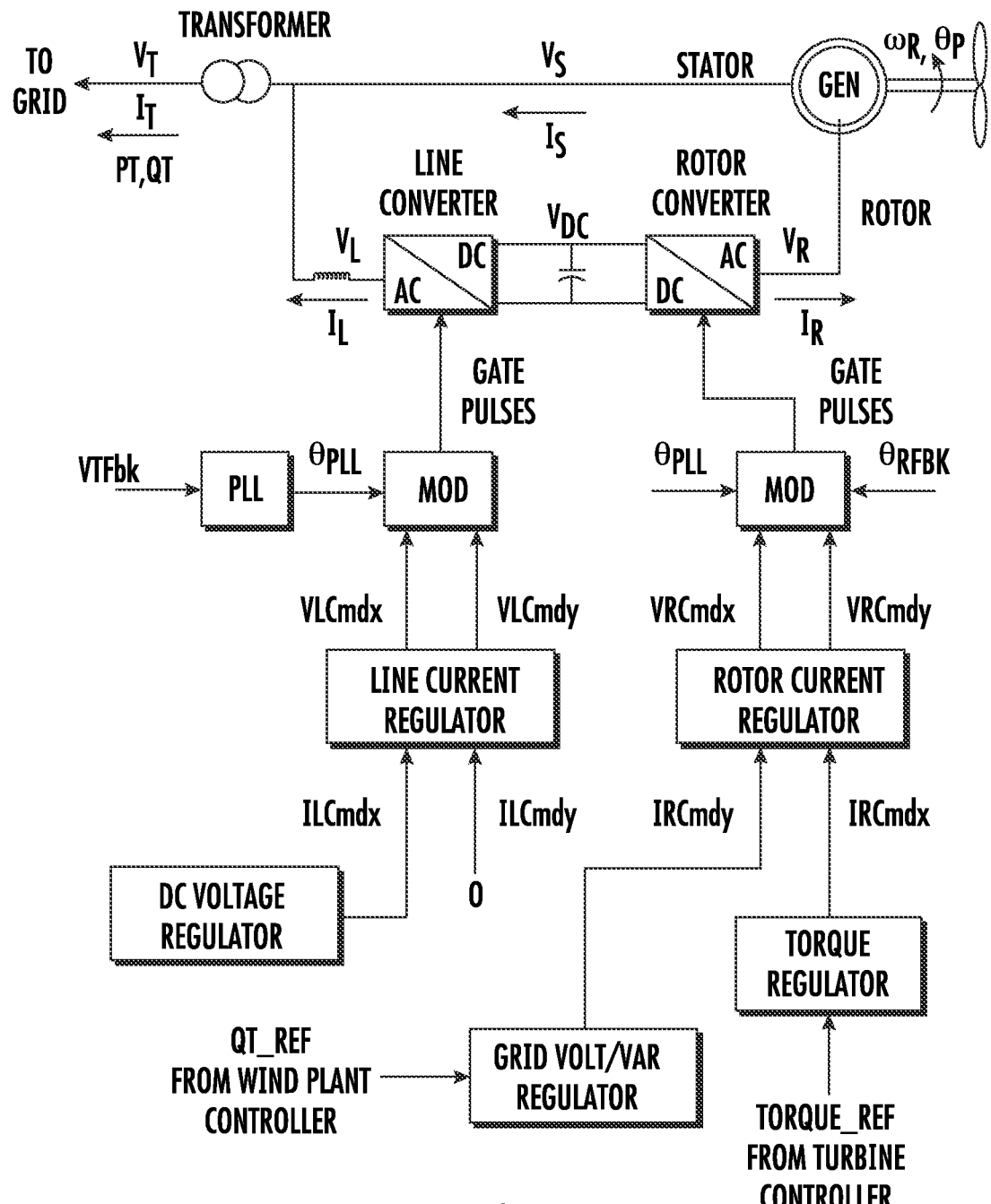
FIG. 1 illustrates a one-line diagram of a doubly-fed wind turbine generator with structure of converter controls for grid-following application according to conventional construction.
Figure 2:
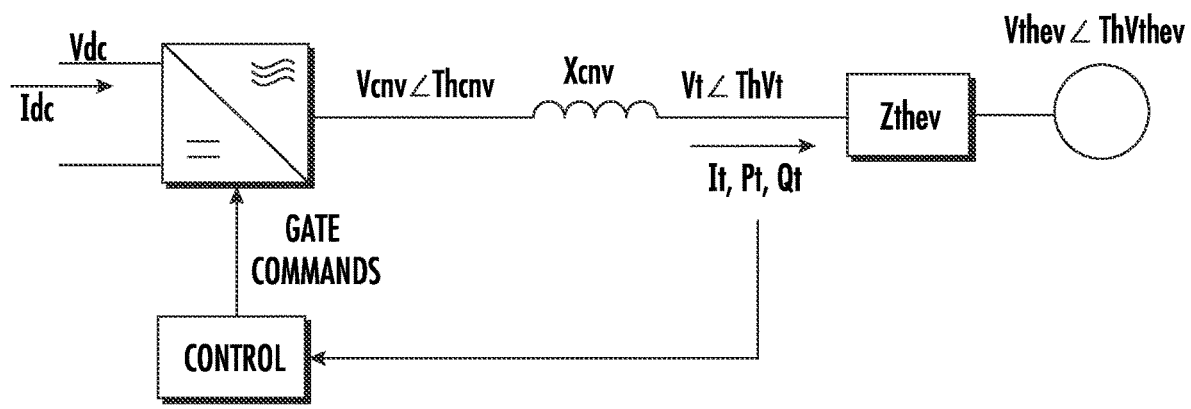
FIG. 2 illustrates a schematic diagram of one embodiment of a main circuit of a grid-forming system according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for controlling an inverter-based resource having an asynchronous machine connected to a power grid to provide grid-forming control of the inverter-based resource. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems. For example, in one embodiment, the inverter-based resource may be a wind turbine power system having a rotor-side converter, a line-side converter, and a doubly-fed induction generator (DFIG) connected to the power grid.

Figure 4:
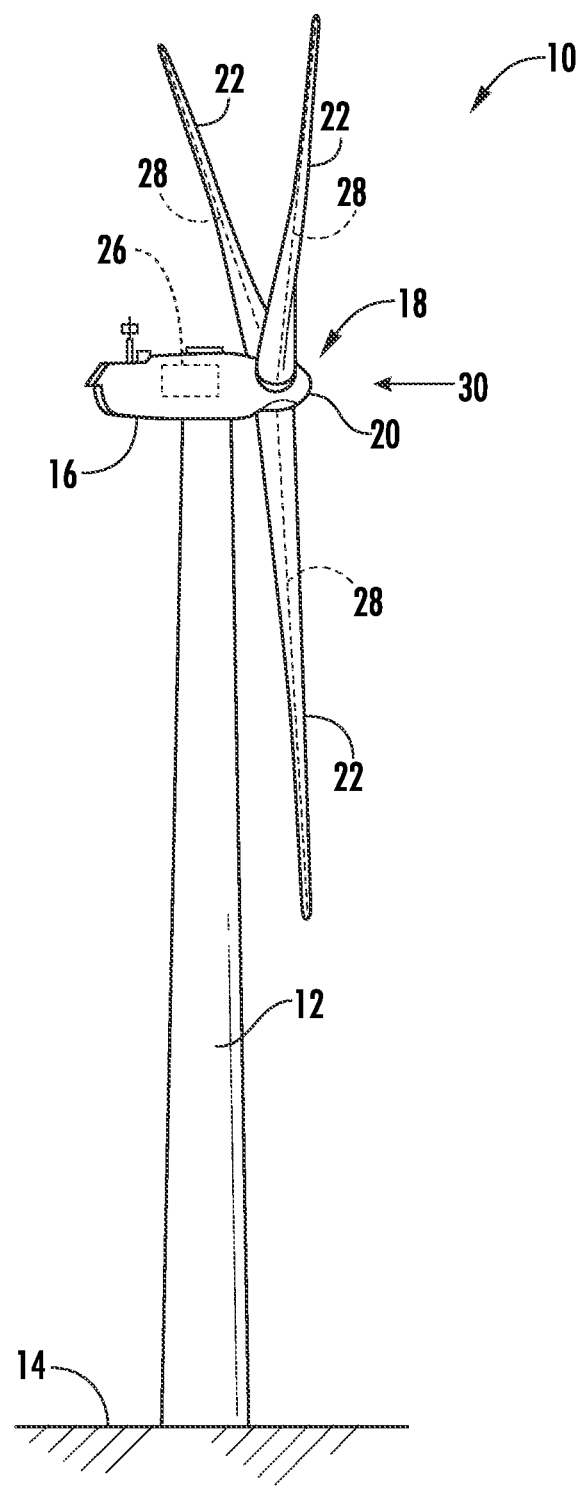
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
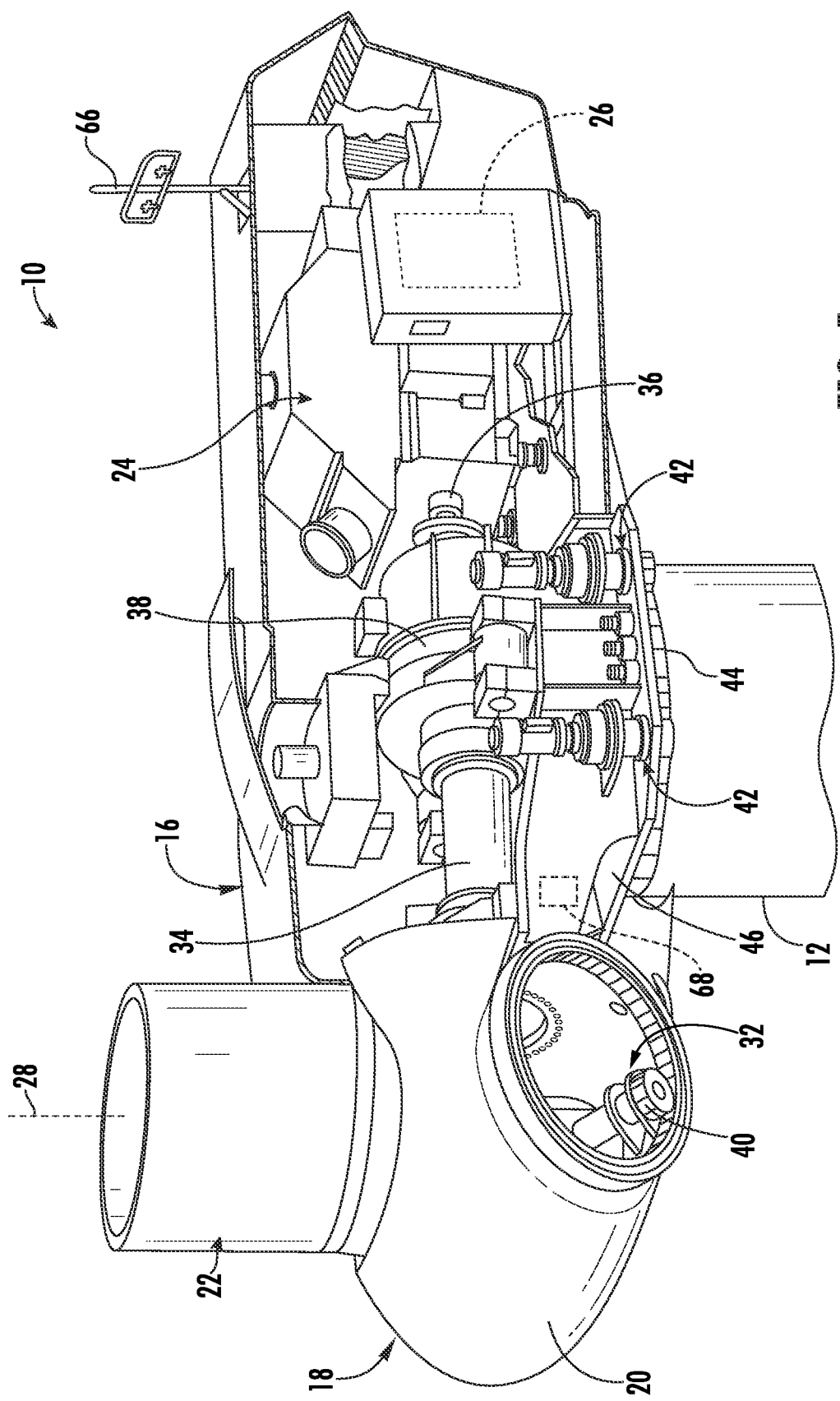
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also include one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
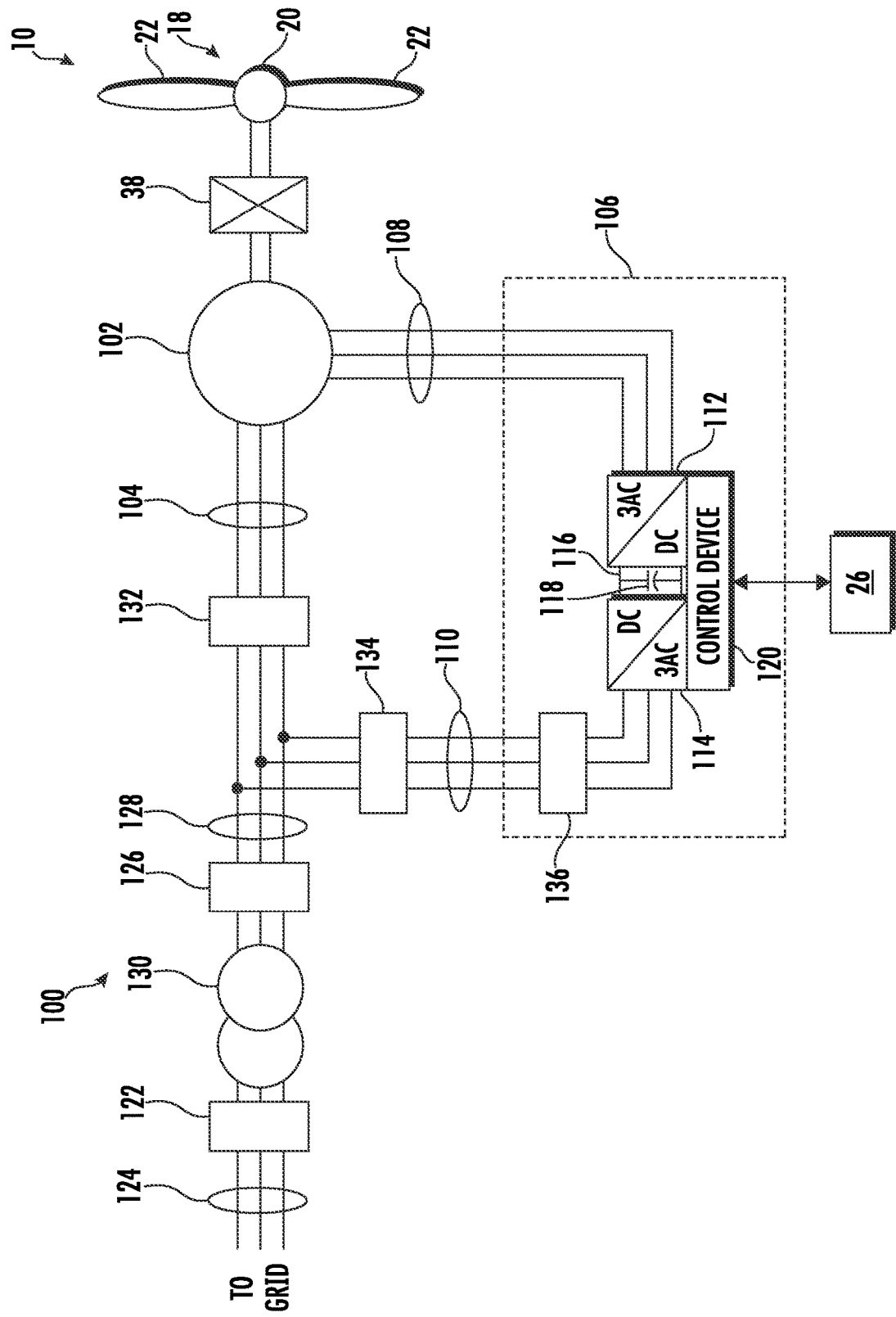
FIG. 6 illustrates a schematic view of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
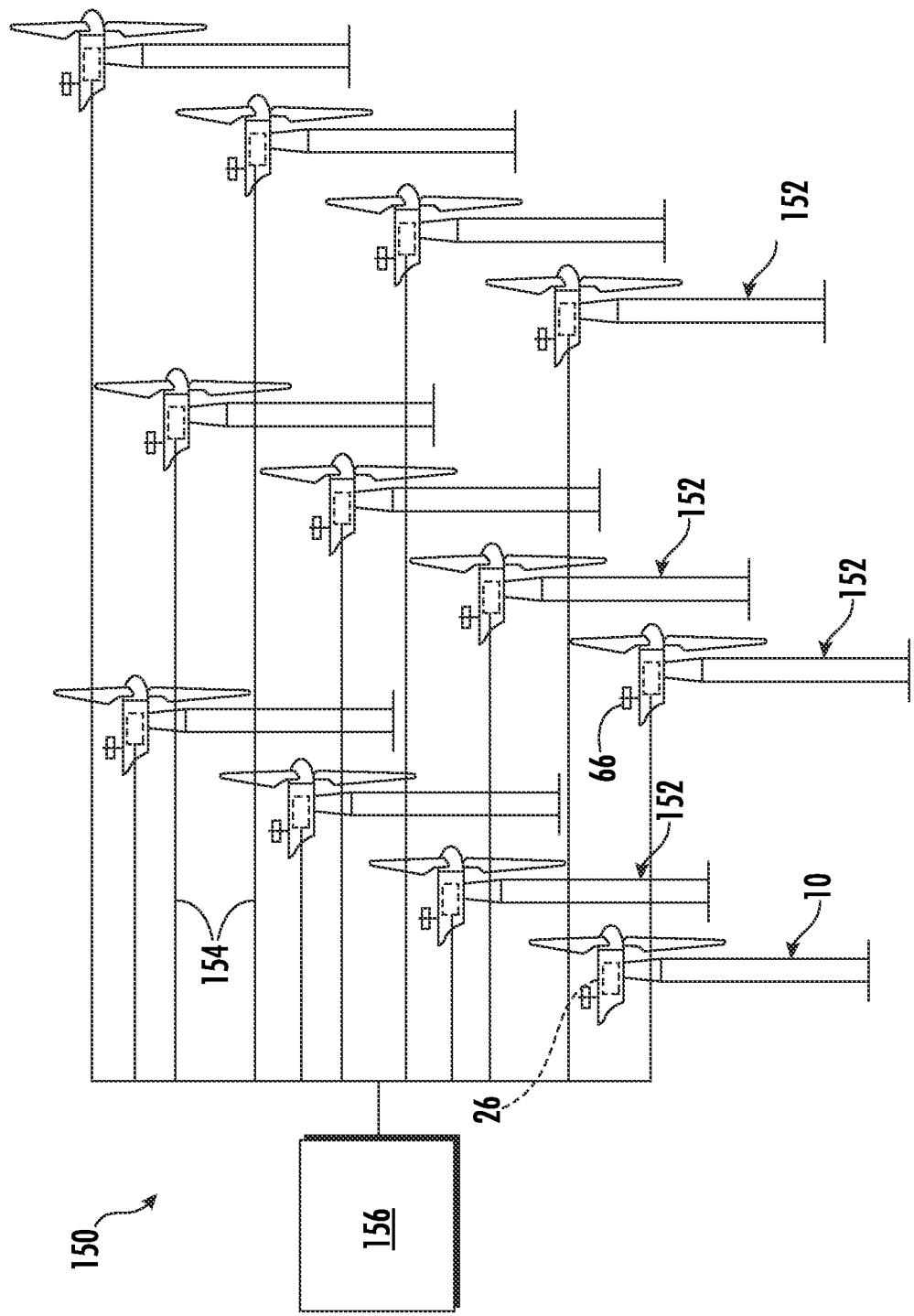
FIG. 7 illustrates a schematic view of one embodiment of a wind farm having a plurality of wind turbines according to the present disclosure.

Referring now to FIG. 7, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g. through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Figure 8:
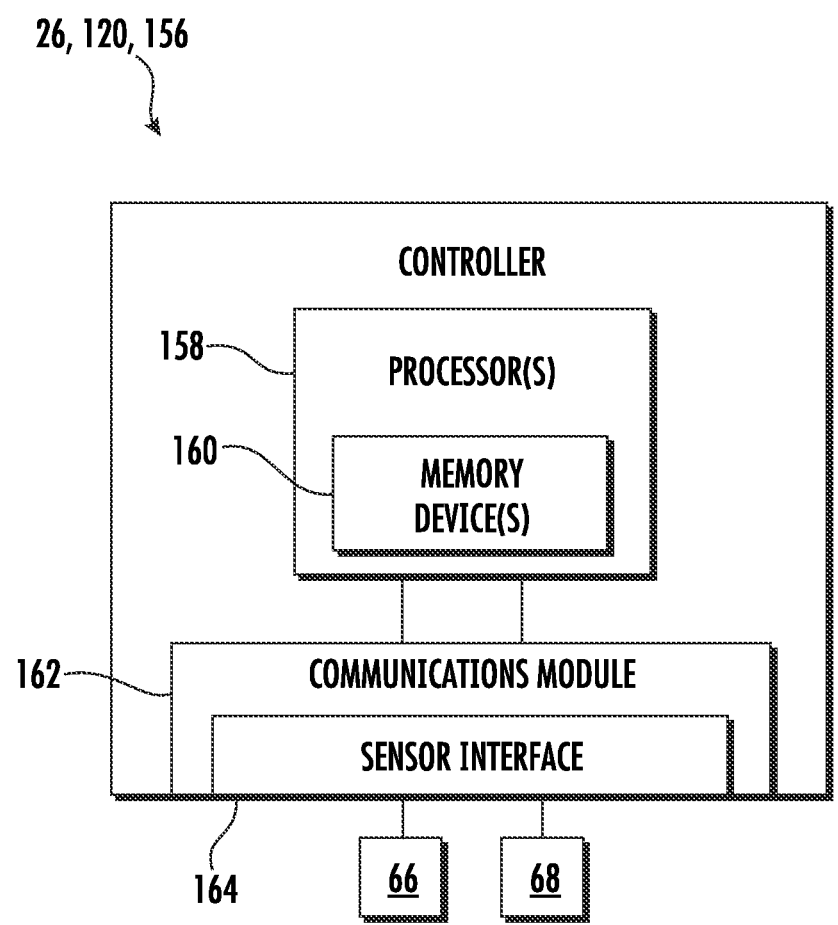
FIG. 8 illustrates a block diagram of one embodiment of a controller according to the present disclosure.

Referring now to FIG. 8, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 9:
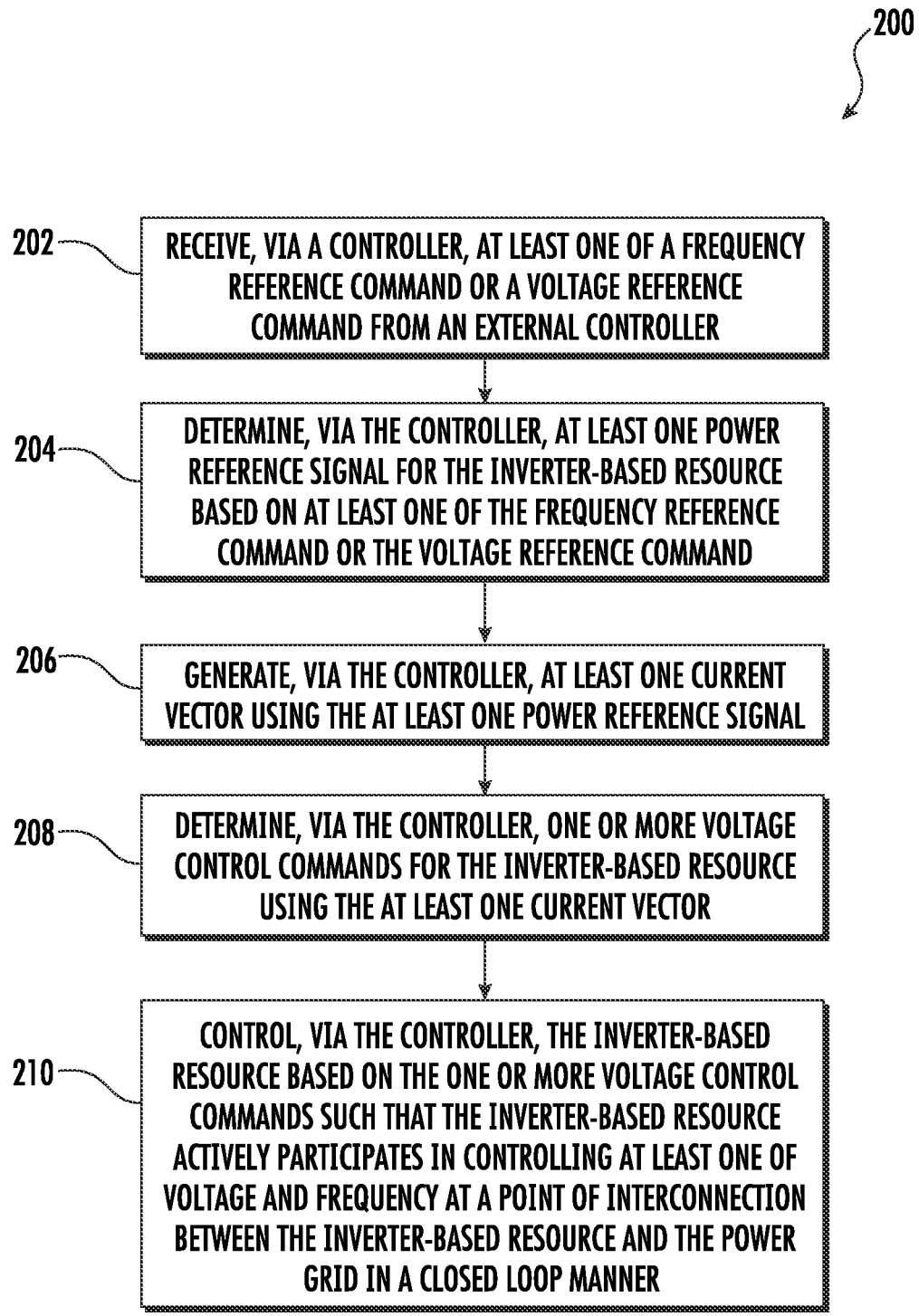
FIG. 9 illustrates a flow diagram of one embodiment of method for operating at least one inverter-based resource having an asynchronous machine connected to a power grid as a virtual synchronous machine to provide grid-forming control of the inverter-based resource according to the present disclosure.

Referring now to FIG. 9, a flow diagram of one embodiment of a method 200 for operating at least one inverter-based resource having an asynchronous machine connected to a power grid as a virtual synchronous machine to provide grid-forming control of the inverter-based resource is provided. In an embodiment, for example, the asynchronous machine may include a doubly-fed induction generator (DFIG), whereas the inverter-based resource may be a wind turbine power system having at least one power converter. In general, the method 200 is described herein with reference to the wind turbine power system 100 of FIGS. 4-8. However, it should be appreciated that the disclosed method 200 may be implemented with any other suitable power generation systems having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via a controller, at least one of a frequency reference command or a voltage reference command from an external controller. As an initial matter, in particular embodiments, the controller described herein may include the turbine controller 26 or the converter controller 120 of the wind turbine power system 100. For example, in an embodiment, the method 200 may include receiving of the frequency reference command and/or the voltage reference command from the external controller in response to a drop in frequency or voltage in the power grid.

As shown at (204), the method 200 includes determining, via the controller, at least one power reference signal for the inverter-based resource based on at least one of the frequency reference command or the voltage reference command. For example, in particular embodiments, the power reference signal(s) may include an active power reference signal and/or a reactive power reference signal.

Still referring to FIG. 9, as shown at (206), the method 200 includes generating, via the controller, at least one current vector using the power reference signal(s). In another embodiment, generating the current vector(s) using the power reference(s) may include determining at least one current vector reference signal using the power reference signal(s) and determining the current vector(s) as a function of the current vector reference signal. Further, in particular embodiments, the method 200 may include determining, via the controller, the current vector(s) as a function of the current vector reference signal and a current vector feedback signal. Moreover, in further embodiments, determining the current vector reference signal using the power reference signal(s) may include applying, via the controller, d-q transformation to the power reference signal(s) to rotate an a-b-c reference frame of the power reference signal(s) to a d-q reference frame to obtain the current vector reference signal(s). Thus, in certain embodiments, the current vector(s) changes to correct for the drop.

As shown at (208), the method 200 includes determining, via the controller, one or more voltage control commands for the inverter-based resource using the at least one current vector. As shown at (210), the method 200 controlling, via the controller, the inverter-based resource based on the one or more voltage control commands such that the inverter-based resource actively participates in controlling at least one of voltage and frequency at a point of interconnection between the inverter-based resource and the power grid in a closed loop manner. For example, in one embodiment, determining the voltage control command(s) for the inverter-based resource using the current vector(s) may include determining, via the controller, one or more voltage vector commands using the current vector(s).

In particular, in such embodiments, determining the voltage vector command(s) using the current vector(s) may include regulating, via a proportional-integral regulator of the controller, the current vector(s) to obtain one or more voltage vector commands. In addition, in further embodiments, determining the voltage control command(s) for the inverter-based resource using the current vector(s) may include rotating, via the controller, the d-q reference frame back to the a-b-c reference frame using a phasor angle to obtain the voltage control command(s) for the inverter-based resource.

Figure 3:
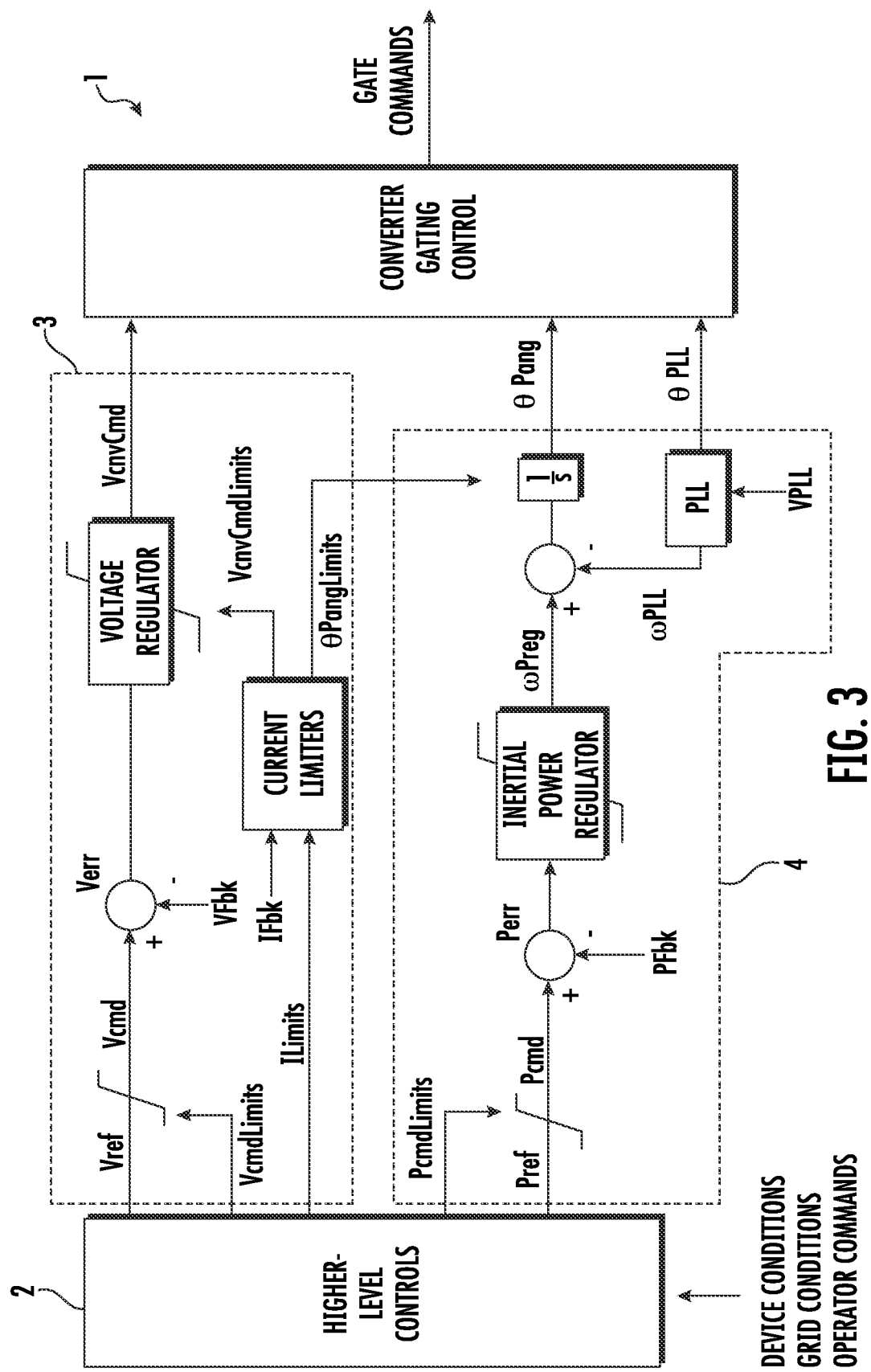
FIG. 3 illustrates a control diagram for providing grid-forming control according to conventional construction.
Figure 10:
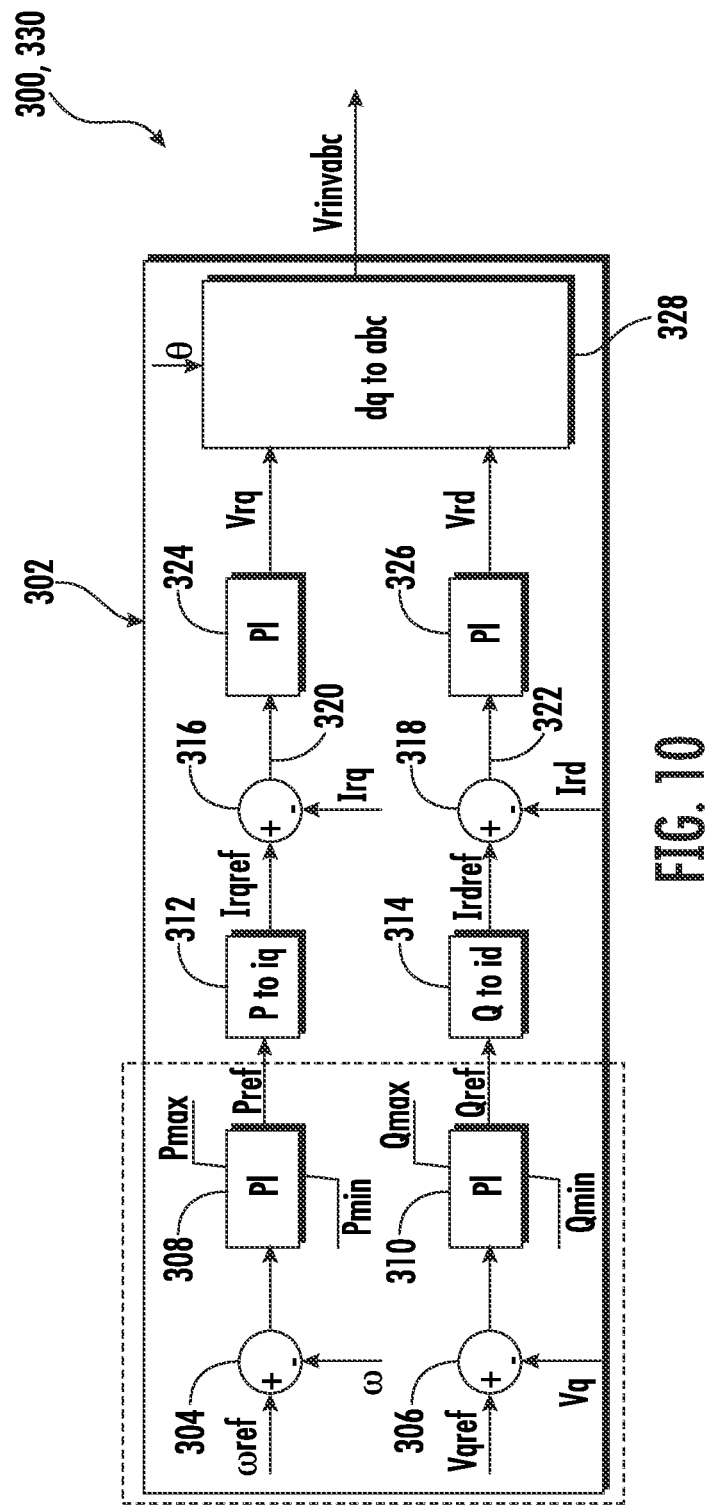
FIG. 10 illustrates a schematic diagram of one embodiment of a system for operating at least one inverter-based resource having an asynchronous machine connected to a power grid as a virtual synchronous machine to provide grid-forming control of the inverter-based resource according to the present disclosure.

The method 200 of FIG. 9 can now be better understood with reference to the system 300 illustrated in FIG. 10. In particular, FIG. 10 illustrates a control diagram of one embodiment of the system 300 for operating at least one inverter-based resource 330 having an asynchronous machine connected to a power grid as a virtual synchronous machine to provide grid-forming control of the inverter-based resource. As shown, the system 300 provides a unique power regulator structure 302 (as compared to the convention power regulator 4 of FIG. 3).

In particular, as shown, the power regulator 302 receives a frequency reference command $\omega_{ref}$ and a voltage reference command $V_{qref}$ from an external controller (e.g. from the farm-level controller 156). Further, as shown at 304 and 306, respectively, the frequency reference command $\omega_{ref}$ and the voltage reference command $V_{qref}$ may each be compared to a frequency feedback signal w and voltage feedback signal $V_q$, respectively. Thus, as shown, the comparisons from 304 and 306 can be regulated via proportional integral regulators 308, 310 having upper and lower limits (e.g. $P_{min}$, $P_{max}$, $Q_{min}$, $Q_{max}$) to determine an active power reference signal $P_{ref}$ and a reactive power reference signal $Q_{ref}$. In addition, as shown at 312 and 314, the system 300 can then generate d- and q-current vector reference signals (e.g. $Irq_{ref}$ and $Ird_{ref}$) using the active power reference signal $P_{ref}$ and a reactive power reference signal $Q_{ref}$, respectively. More specifically, as shown, the system 300 may apply d-q transformation to the active power reference signal $P_{ref}$ and a reactive power reference signal $Q_{ref}$, respectively, to rotate an a-b-c reference frame of the power reference signal(s) to a d-q reference frame to obtain the current vector reference signals $Irq_{ref}$ and $Ird_{ref}$.

As shown at 316 and 318, the system 300 can then compare the current vector reference signals $Irq_{ref}$ and $Ird_{ref}$ to respective current vector feedback signals Irq and Ird. Thus, in certain embodiments, the current vectors (i.e. the outputs 320, 322) change to correct for an drop in the frequency and/or voltage in the power grid. In particular, the outputs 320, 322 from the comparisons can be regulated via proportional integral regulators 324, 326 to determine voltage vector commands Vrq and Vrd. The d-q reference frame of the voltage vector commands Vrq and Vrd can then be rotated back to the a-b-c reference frame using a phasor angle θ to obtain at least one voltage control command(s) (e.g. Vrinvabc) for the inverter-based resource. Accordingly, the power regulator 302 operates the inverter-based resource based on the voltage control command(s) Vrinvabc such that the inverter-based resource actively participates in controlling voltage and/or frequency at a point of interconnection between the inverter-based resource and the power grid in a closed loop manner.

Figure 11:
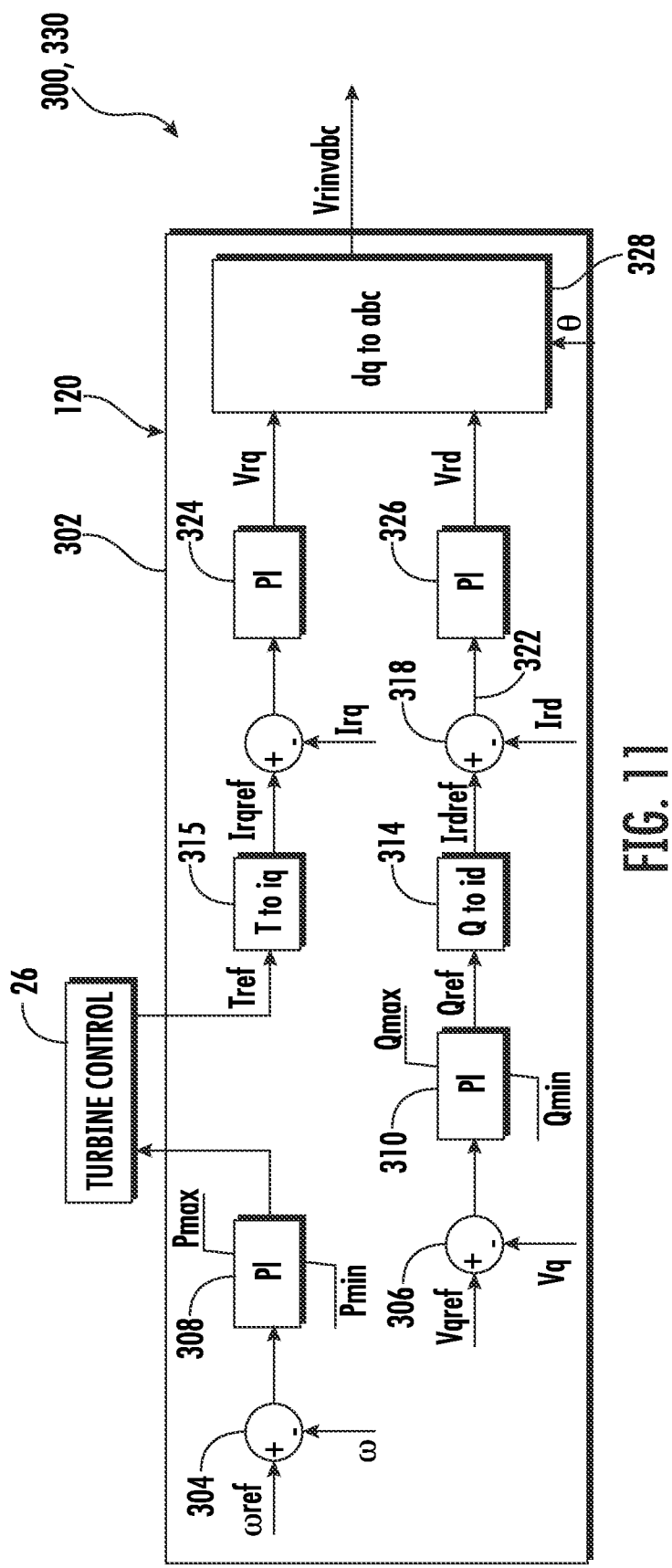
FIG. 11 illustrates a schematic diagram of another embodiment of a system for operating at least one inverter-based resource having an asynchronous machine connected to a power grid as a virtual synchronous machine to provide grid-forming control of the inverter-based resource according to the present disclosure.
Figure 12:
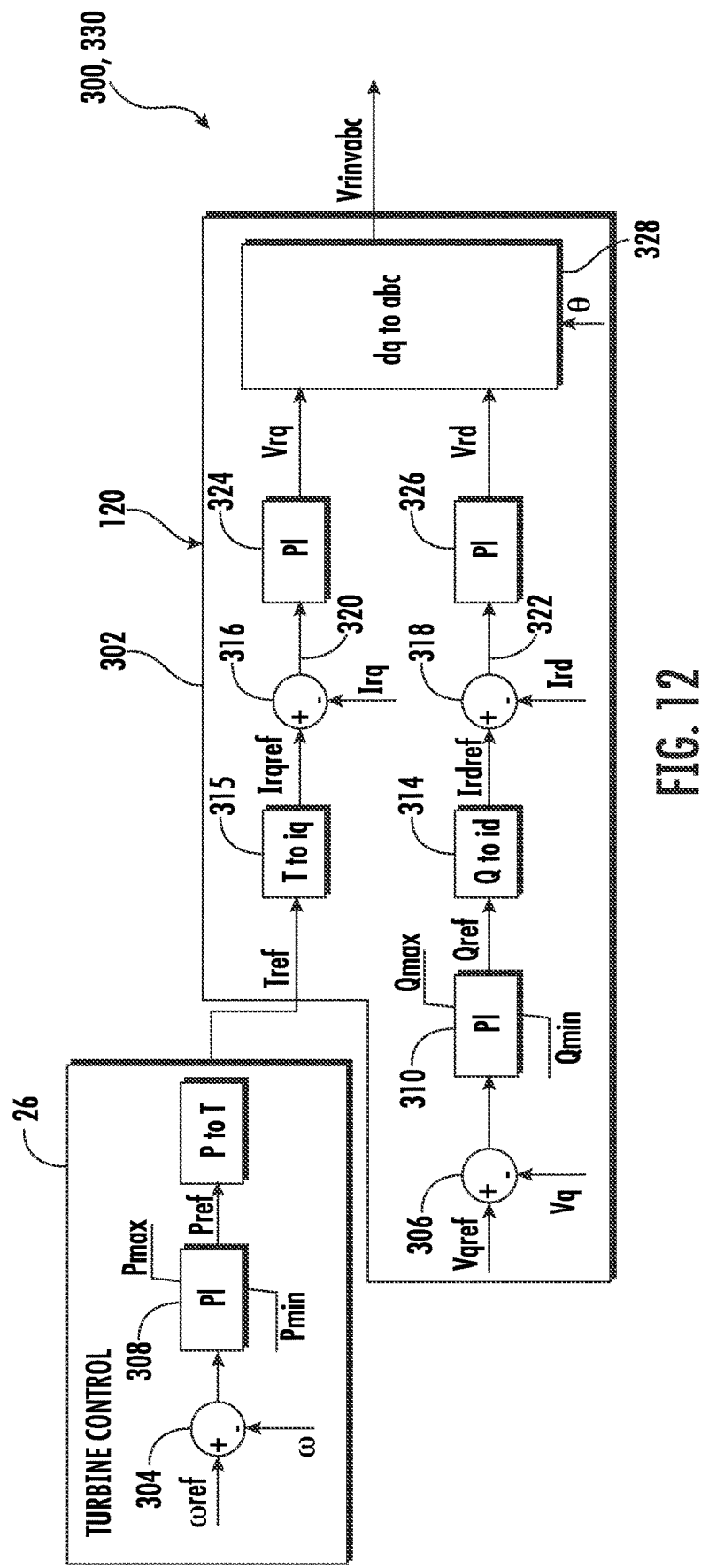
FIG. 12 illustrates a schematic diagram of still another embodiment of a system for operating at least one inverter-based resource having an asynchronous machine connected to a power grid as a virtual synchronous machine to provide grid-forming control of the inverter-based resource according to the present disclosure.

Referring now to FIGS. 11 and 12, and as mentioned previously, the systems and methods of the present disclosure may be implemented via the turbine controller 26 and/or the converter controller 120. It should further be understood that components having like numbering are meant to designate a common component. For example, as shown at 304 in FIG. 11, the frequency reference command $\omega_{ref}$ may be compared to the frequency feedback signal w via the converter controller 120. Further, as shown, the converter controller 120 may then regulate the comparison via proportional integral regulator 308. The output from the regulator 308 can then be sent to the turbine controller 26. Thus, as shown, the turbine controller 26 can then determine a torque reference $T_{ref}$ that can be sent back to the converter controller 120. As shown at 315, the converter controller 120 can may apply d-q transformation to the torque reference $T_{ref}$ to rotate an a-b-c reference frame of the torque reference $T_{ref}$ to a d-q reference frame to obtain the current vector reference signal $Irq_{ref}$. The current vector reference signal $Ird_{ref}$ is generated in the same manner as shown in FIG. 10. Thus, the converter controller 120 then continues to generate the voltage control command(s) Vrinvabc as shown with respect to FIG. 10.

In another embodiment, as shown in FIG. 12, as shown at 304, the frequency reference command cord may be compared to the frequency feedback signal w via the turbine controller 26. Further, as shown, the turbine controller 26 may then regulate the comparison via proportional integral regulator 308. The active power reference $P_{ref}$ from the regulator 308 can then be used to determine a torque reference $T_{ref}$. The torque reference $T_{ref}$ can then be sent to the converter controller 120. As shown at 315, the converter controller 120 can may apply d-q transformation to the torque reference $T_{ref}$ to rotate an a-b-c reference frame of the torque reference $T_{ref}$ to a d-q reference frame to obtain the current vector reference signal $Irq_{ref}$. The current vector reference signal $Ird_{ref}$ is generated in the same manner as shown in FIG. 10. Thus, the converter controller 120 then continues to generate the voltage control command(s) Vrinvabc as shown with respect to FIG. 10.

Figure 13A:
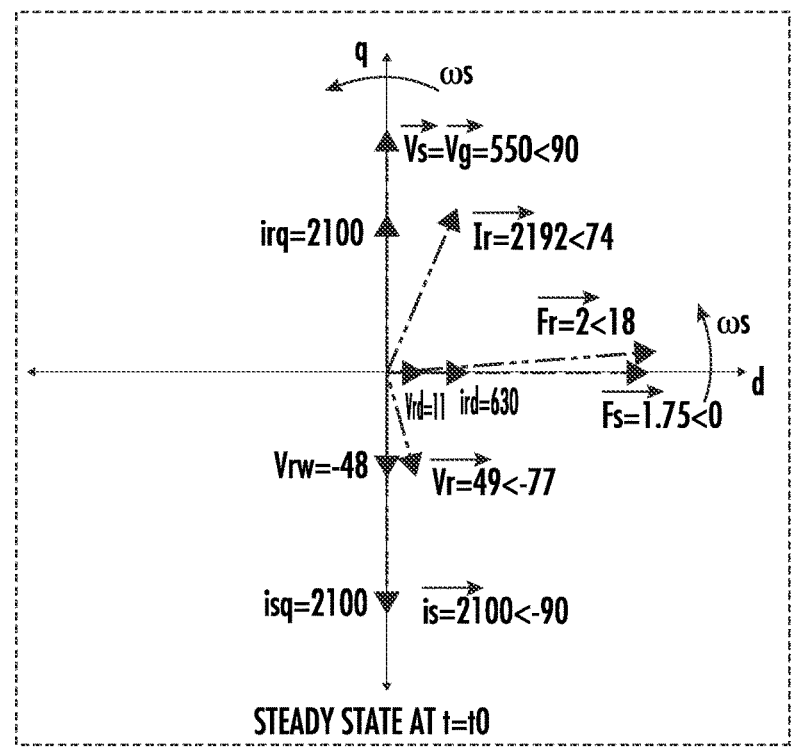
FIGS. 13A-13D illustrate various graphs to depict advantages of grid forming frequency control according to the present disclosure.
Figure 13B:
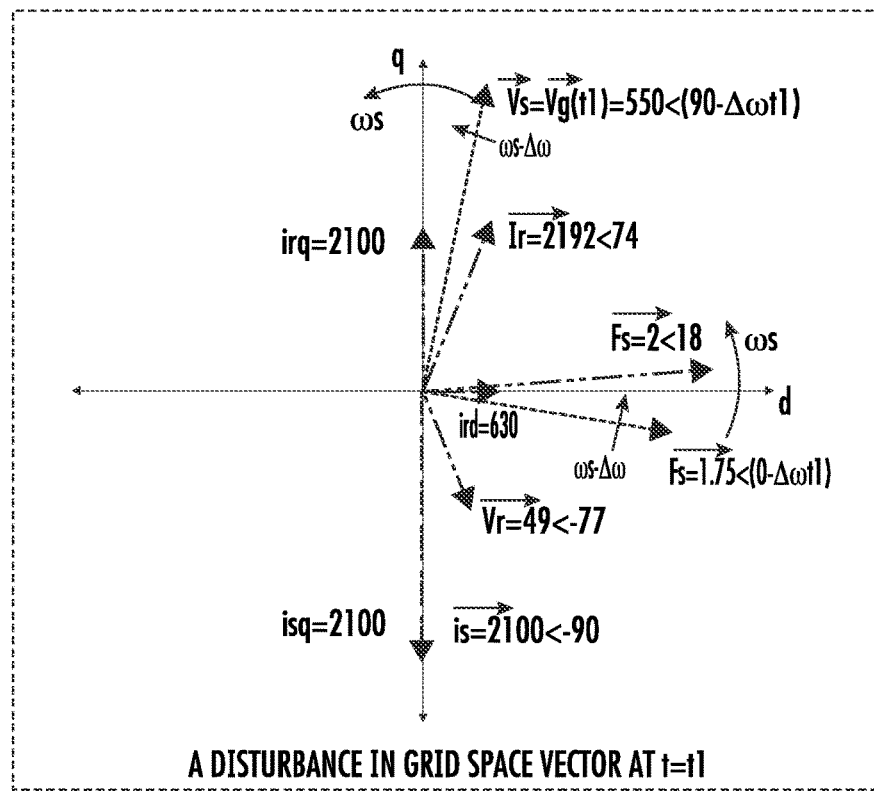
Figure 13C:
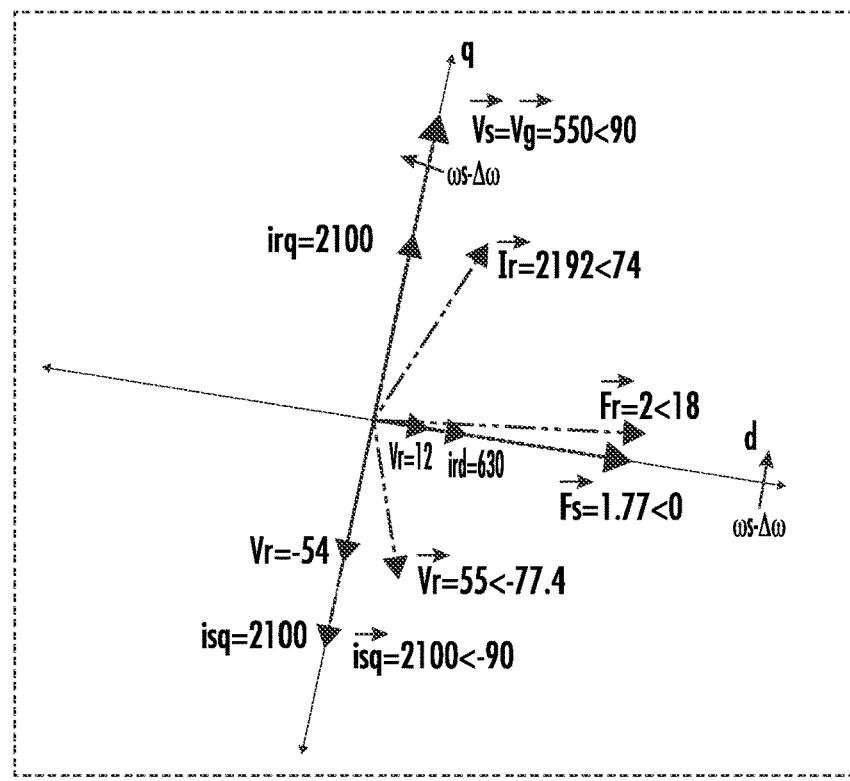
Figure 13D:
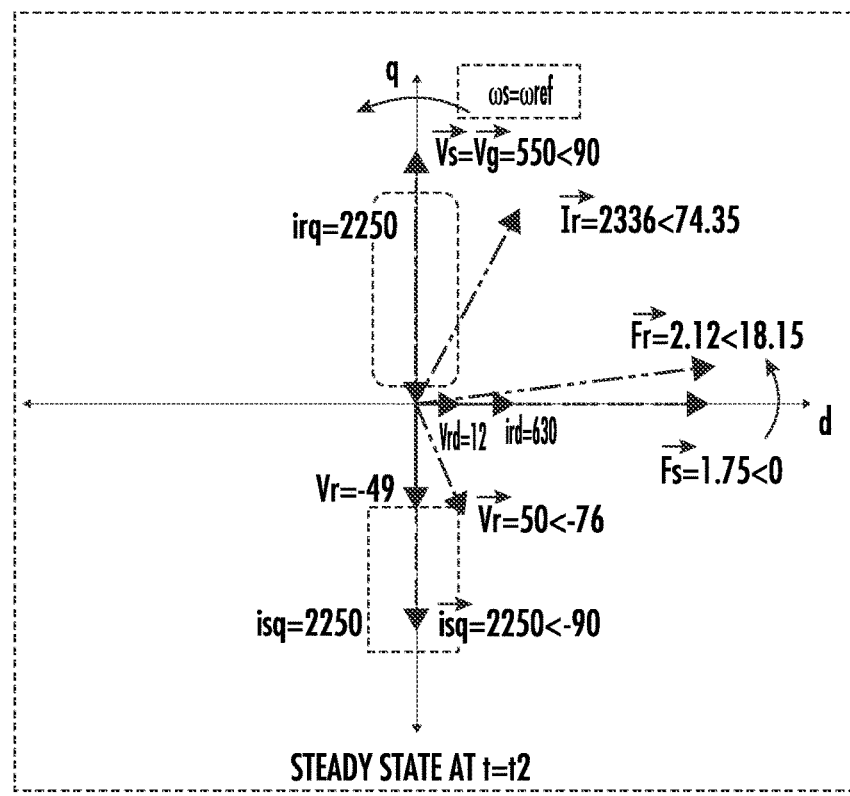

Referring now to FIGS. 13A-14D, various graphs are provided to illustrate frequency (FIGS. 13A-13D) and voltage control (FIGS. 14A-14D) according to the present disclosure. Referring particularly to FIG. 13A, a baseline of the various voltage and current vectors are provided. FIG. 13B illustrates the change in the voltage and current vectors when a frequency disturbance is introduced by the power grid. FIG. 13C illustrates the voltage and current vectors of the inverter-based resource being controlled according to conventional grid following concepts, which aim to meet active and reactive power setpoints and does not restore grid frequency. In contrast, FIG. 13D illustrates the voltage and current vectors of the inverter-based resource being controlled according to the grid forming concepts described herein, which aim to restore the frequency to the power grid by pushing additional power thereto. In such instances, for the grid-following method, the rotor current vector remains the same, whereas, for the grid-forming method, the rotor current vector changes to correct the grid frequency. In both cases, as shown, the rotor voltage vector is changed to compensate for the changes.

Figure 14A:
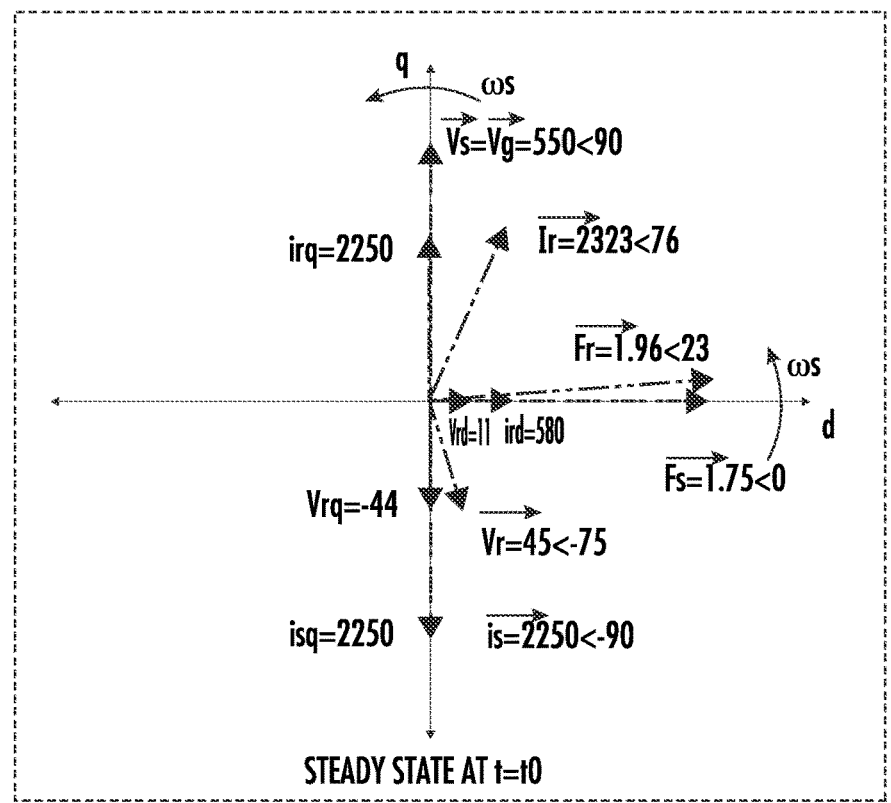
FIGS. 14A-14D illustrate various graphs to depict advantages of grid forming voltage control according to the present disclosure.
Figure 14B:
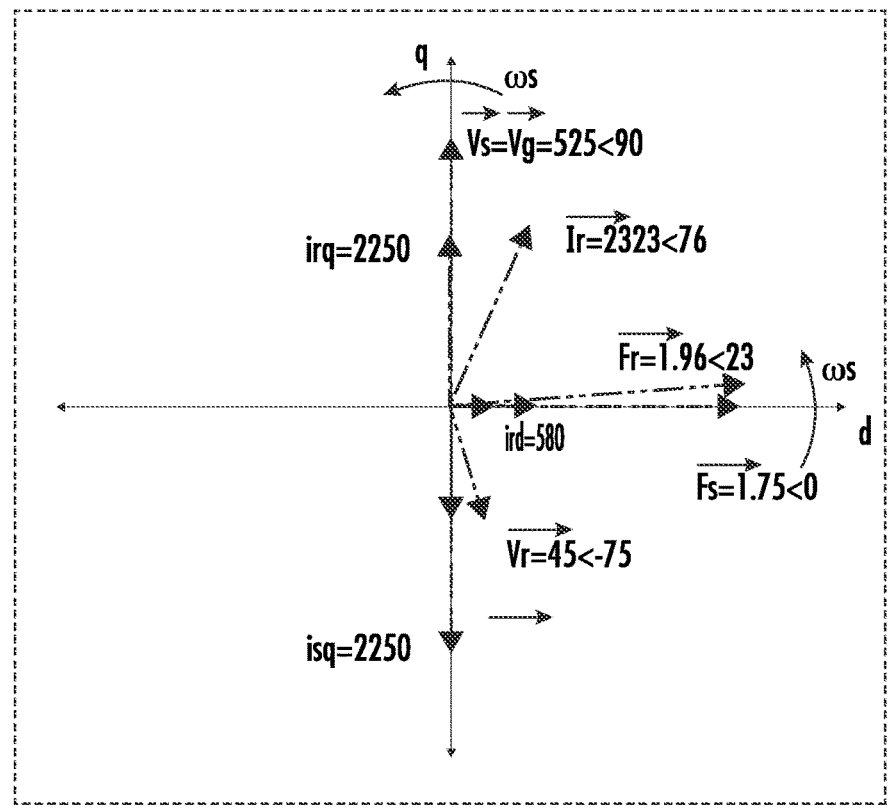
Figure 14C:
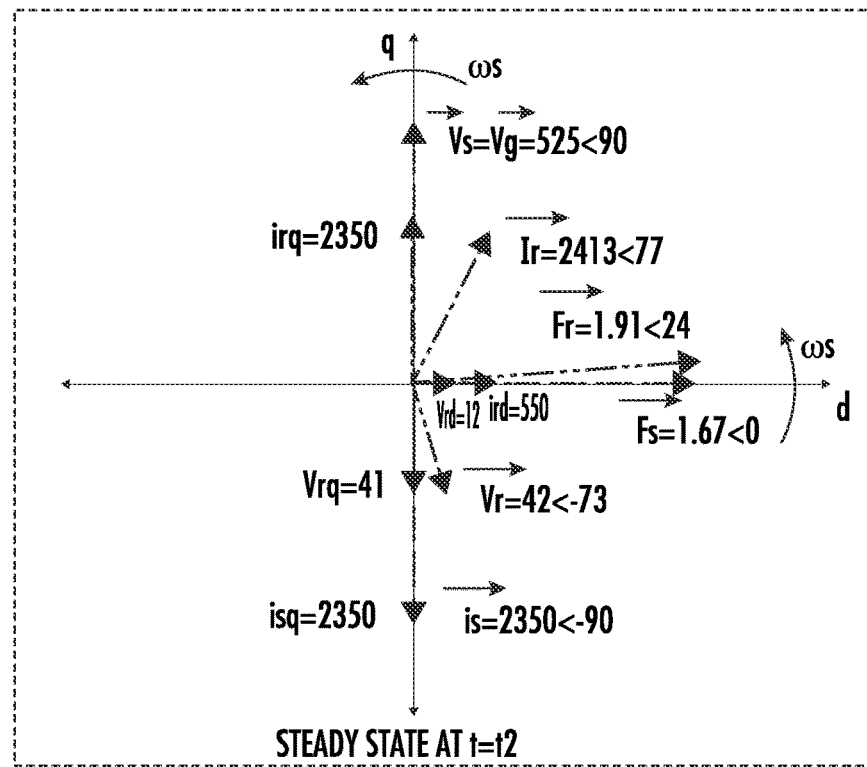
Figure 14D:
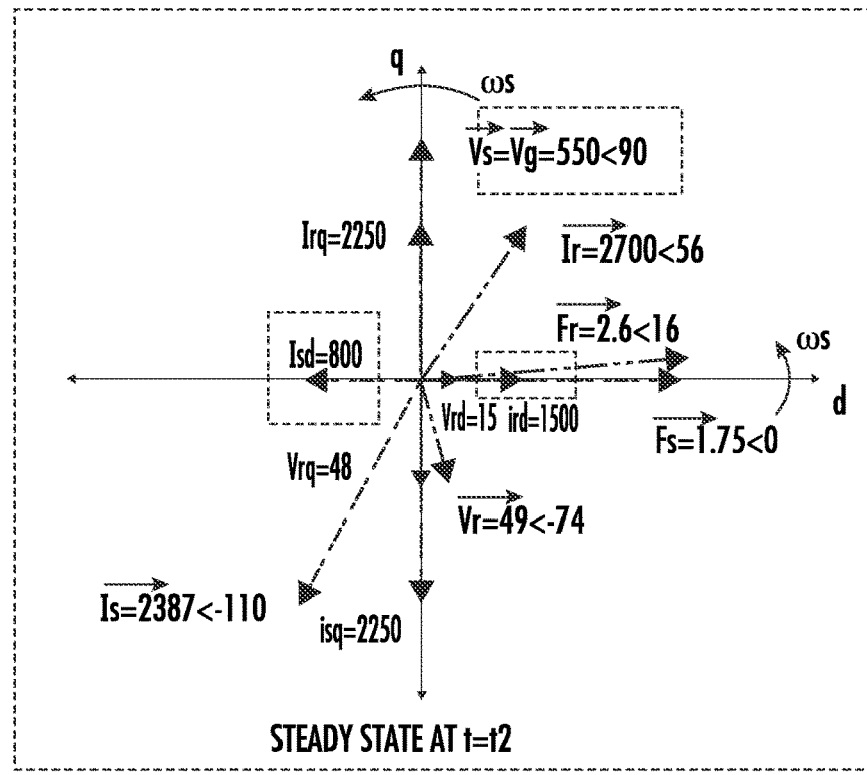

Referring now to FIG. 14A, a baseline of the various voltage and current vectors are provided. FIG. 14B illustrates the change in the voltage and current vectors when a voltage disturbance is introduced by the power grid. FIG. 14C illustrates the voltage and current vectors of the inverter-based resource being controlled according to conventional grid following concepts, which aim to meet active and reactive power setpoints and does not restore grid voltage. In contrast, FIG. 14D illustrates the voltage and current vectors of the inverter-based resource being controlled according to the grid forming concepts described herein, which aim to restore the voltage to the power grid by pushing additional reactive power thereto. In such instances, for the grid-following method, the rotor current vector remains the same, whereas, for the grid-forming method, the rotor current vector changes to correct the grid voltage.

Figure 15:
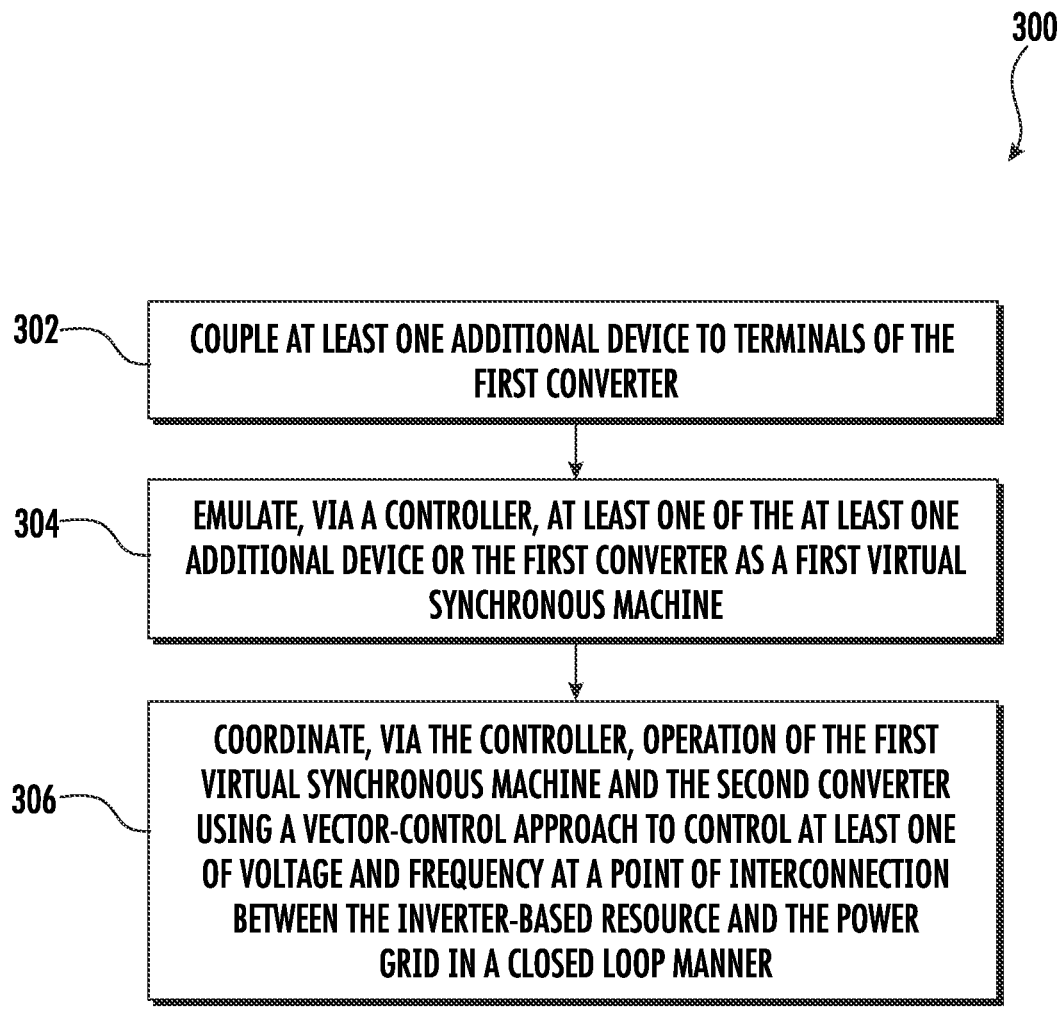
FIG. 15 illustrates a flow diagram of one embodiment of method for controlling an inverter-based resource having an asynchronous machine connected to a power grid to provide grid-forming control of the inverter-based resource according to the present disclosure.

Referring now to FIG. 15, a flow diagram of an embodiment of a method 300 for controlling an inverter-based resource having an asynchronous machine connected to a power grid to provide grid-forming control of the inverter-based resource is provided. In an embodiment, for example, the asynchronous machine may include a doubly-fed induction generator (DFIG), whereas the inverter-based resource may be a wind turbine power system having at least one power conversion assembly having a first converter and a second converter. In general, the method 200 is described herein with reference to the wind turbine power system 100 of FIGS. 4-8. Thus, the first converter may be the LSC 114, whereas the second converter may be the RSC 112. However, it should be appreciated that the disclosed method 200 may be implemented with any other suitable power generation systems having any other suitable configurations. In addition, although FIG. 15 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes coupling at least one additional device to terminals of the first converter. As shown at (304), the method 300 includes emulating, via a controller, at least one of the at least one additional device or the first converter as a first virtual synchronous machine. As shown at (306), the method 300 includes coordinating, via the controller, operation of the first virtual synchronous machine and the second converter using a vector-control approach to control at least one of voltage and frequency at a point of interconnection 154 between the inverter-based resource and the power grid in a closed loop manner.

Figure 16:
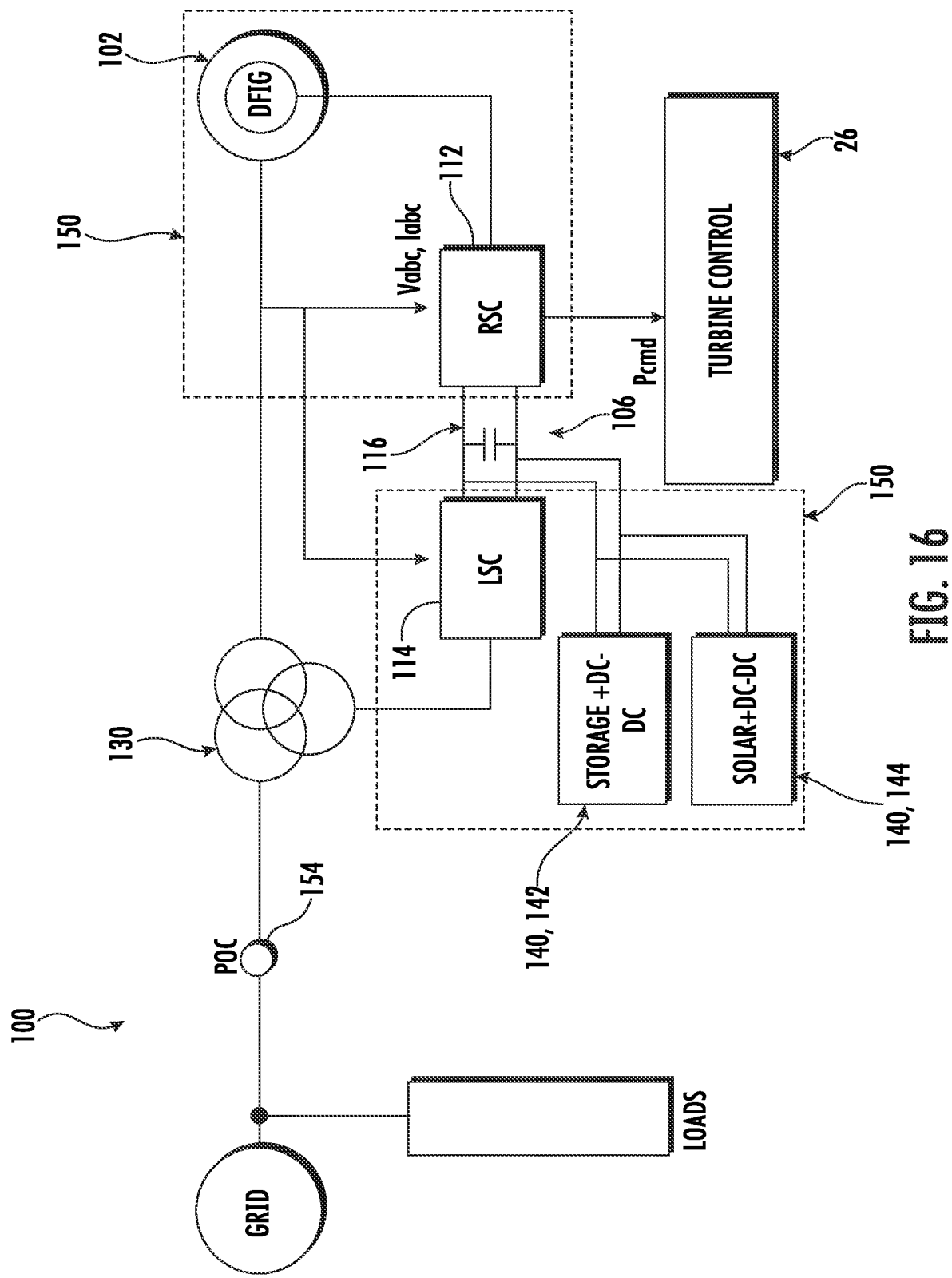
FIG. 16 illustrates a schematic view of one embodiment of a DFIG wind turbine power system being emulated as two virtual synchronous machine connected in parallel according to the present disclosure.
Figure 17:
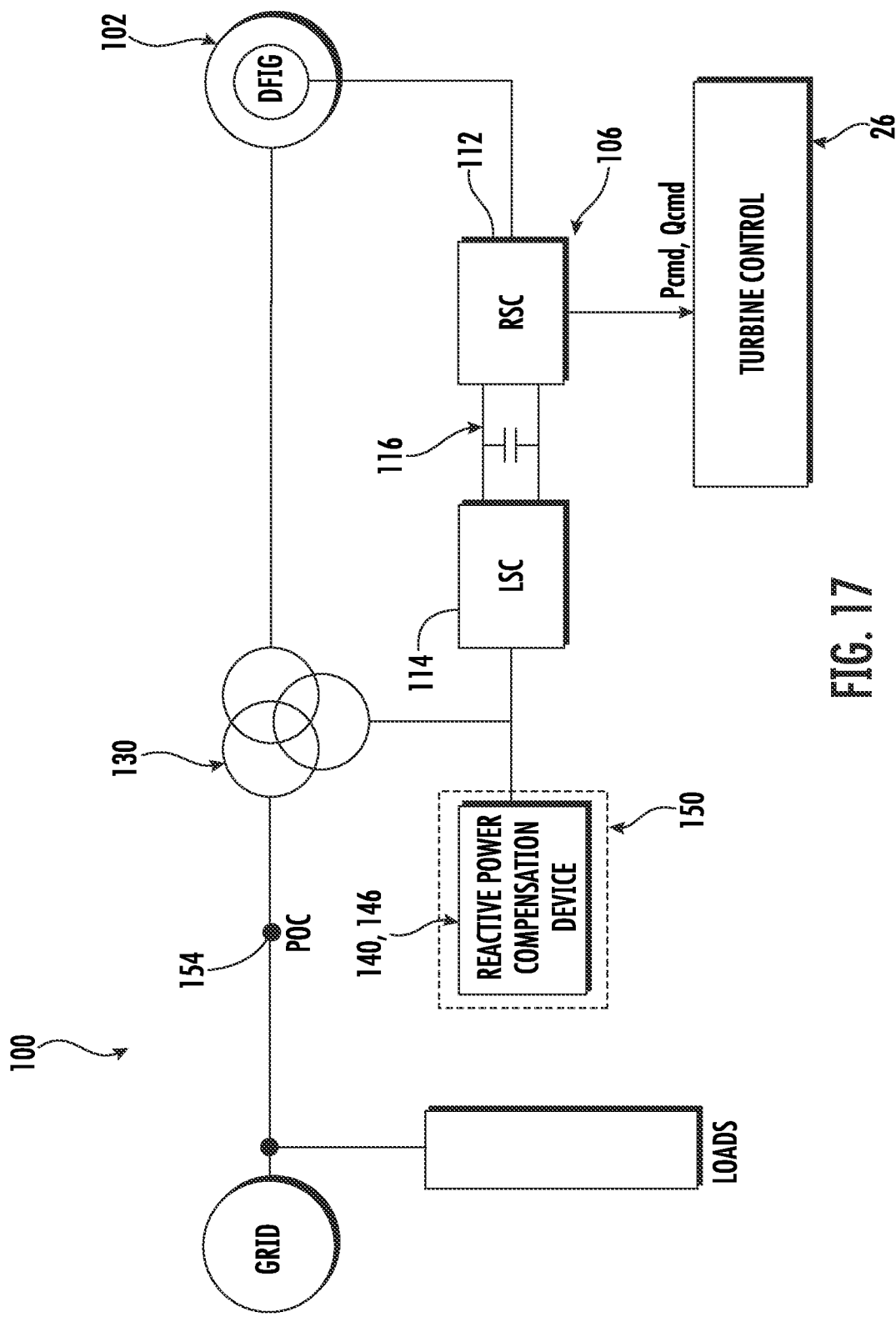
FIG. 17 illustrates a schematic view of one embodiment of a DFIG wind turbine power system in which a reactive power compensation device with storage is being emulated as a virtual synchronous machine according to the present disclosure.
Figure 18:
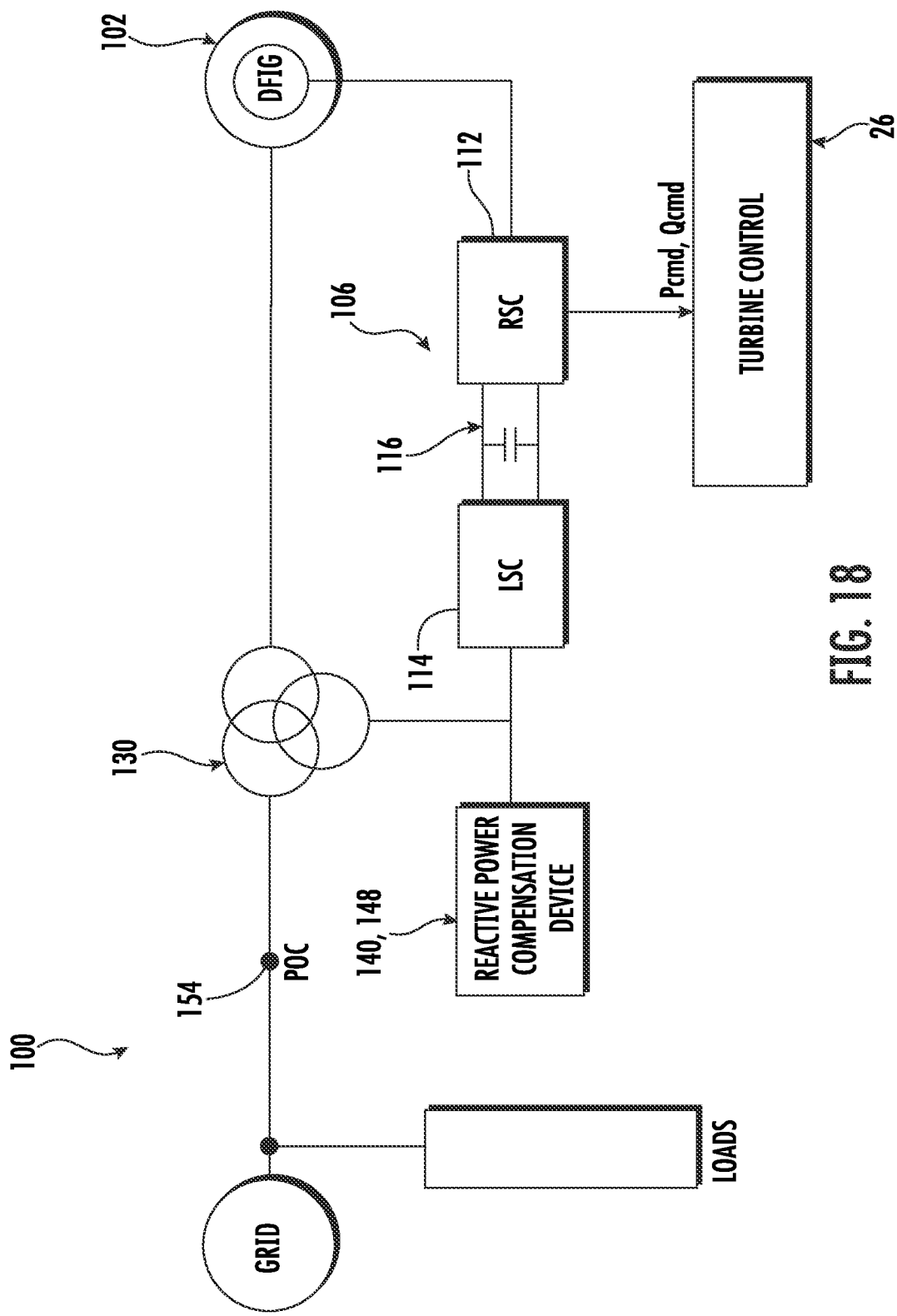
FIG. 18 illustrates a schematic view of one embodiment of a DFIG wind turbine power system in which a reactive power compensation device without storage is being emulated as a virtual synchronous machine according to the present disclosure.

The method 300 of FIG. 15 can be better understood with reference to FIGS. 16 through 18. For example, as shown particularly in FIG. 16, in an embodiment, the additional device(s) 140 coupled to the LSC 114 may be a storage device 142. In addition, as shown, the additional device(s) 140 may also include an additional hybrid power source 144. For example, the hybrid power source 144 may include a solar power source, a wind power source, a hydropower source, an energy storage device, or similar.

Thus, in the illustrated embodiment of FIG. 16, the controller (i.e. any of the controllers described herein) is configured to emulate the additional device(s) 140 and the LSC 114 as a first virtual synchronous machine 150 (as indicated by dotted box 150). Moreover, as shown, the controller can also emulate the RSC 112 and the generator (e.g. the asynchronous machine) as a second virtual synchronous machine 152 (as indicated by dotted box 152). More particularly, as shown, the second virtual synchronous machine 152 may be connected in parallel to the first virtual synchronous machine 150.

Thus, for the inverter-based resource illustrated in FIG. 16, control for both the RSC 112 and the LSC 114 is modified to emulate as parallel synchronous machines and an additional storage device 140 is coupled to the LSC 114. More specifically, as previously described herein, the control strategy of the LSC 114 is changed from standalone P, Q control to voltage/frequency control. Moreover, the RSC control strategy is changed from DC link /Q control to voltage/frequency control. As such, the frequency loop controls any deviations in the grid frequency on an instantaneous manner. In the RSC 112, for example, a proportional change in the q' axis rotor current is introduced to arrest the perturbations in grid frequency. The voltage control loop controls any deviations in the grid voltage magnitude on an instantaneous manner. A proportional change in the 'd' axis rotor current is introduced to arrest the perturbations in grid voltage magnitude. Similarly, in the LSC control, a proportional change in the 'd' axis line side current is introduced to arrest the perturbations in grid frequency. A proportional change in the 'q' axis line side current is introduced to arrest the perturbations in grid voltage magnitude. The proportion of control exhibited by the LSC 114 and the RSC 112 depends on their respective droops. More specifically, in certain embodiments, the controller may incorporate a droop characteristic into the voltage and frequency control loops of the LSC 114 and the RSC 112 to coordinate operation of the first and second virtual synchronous machines 150, 152 using vector-control to control the voltage and/or frequency at the point of interconnection 154 between the inverter-based resource 100 and the power grid in the closed loop manner. In such embodiments, the droop characteristics can enable the effective parallel operation of the first and second virtual synchronous machines 150, 152.

In such embodiments, the complete control structure of both the LSC 114 and the RSC 112 is executed in a synchronously rotating reference frame with respect to the grid space vector. Thus, vector control is maintained and imparts an instantaneous control of voltage and frequency limited only by the switching frequency of the LSC 114 and the RSC 112. Accordingly, the complete control emulates the DFIG-based wind turbine power system as two virtual synchronous machines operating in parallel.

In certain embodiments, when the LSC 114 and the RSC 112 are operating as virtual synchronous machines, each converter can share loads based on a droop method where both the LSC 114 and the RSC 112 can have independent frequency and voltage control loops. In another embodiment, the LSC 114 and the RSC 112 can be operated using a proportional gain method where a single outer frequency and voltage loop aided by a proportional integral controller determines the total power references in response to a deviation in either frequency or voltage. In such embodiments, the total power reference can be passed through gain blocks (e.g. k, 1-k), which sets the proportional power references for the LSC 114 and the RSC 112, respectively. Further, the gain constant k may be a function of the maximum input power to the DFIG. Thus, in an embodiment, k can be equated using Equation (1) below:

$$k = P_{mpp}/P_{ref}\text{ total} \qquad \text{Equation (1)}$$

where Pmpp is the maximum input power to the DFIG, and $P_{ref}$ total is the output of the PI controller of the single outer frequency loop.

Referring now to FIG. 17, in another embodiment, the additional device(s) 140 coupled to the LSC 114 may include a reactive power compensation device 146. In such embodiments, the controller (i.e. any of the controllers described herein) is configured to emulate the reactive power compensation device 146 as the first virtual synchronous machine 150. Further, in such embodiments, the first virtual synchronous machine 150 may be a vector-control-based synchronous machine, such as those described herein. Moreover, in such embodiments, as shown, the reactive power compensation device 146 may include the at least one storage device, e.g. such as integrated storage capacity. Thus, the reactive power compensation device 146 with the integrated storage is controlled as a vector-control-based virtual synchronous machine to control grid voltage and frequency at the point of interconnection 154 as described herein.

Referring now to FIG. 18, in still another embodiment, the additional device(s) 140 coupled to the LSC 114 may include a reactive power compensation device 148. However, in contrast to FIG. 17 and as shown, the reactive power compensation device 148 is absent of storage (i.e. the device 148 does not include integrated storage). Thus, as shown, the separate reactive power compensation device 148 without storage can be installed at the LSC terminals to control the disturbances in voltage and/or frequency at the point of interconnection 154 as described herein.

It should be further understood that coordinating operation of the first virtual synchronous machine 150 and the RSC 112 (i.e. either alone or combined with DFIG 102 to emulate the second virtual synchronous machine 152) using vector-control to control voltage and/or frequency at the point of interconnection 154 may be completed using the approaches described with respect to FIGS. 9-12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource having an asynchronous machine connected to a power grid to provide grid-forming control of the inverter-based resource, the inverter-based resource having a first converter and a second converter, the method comprising:
coupling at least one additional device to terminals of the first converter;

emulating, via a controller, at least one of the at least one additional device or the first converter as a first virtual synchronous machine; and coordinating, via the controller, operation of the first virtual synchronous machine and the second converter using a vector-control approach to control at least one of voltage and frequency at a point of interconnection between the inverter-based resource and the power grid in a closed loop manner.

2. The method of claim 1, wherein the at least one additional device comprises a storage device.

3. The method of claim 1, wherein the at least one additional device comprises an additional hybrid power source, the hybrid power source comprising at least one of a solar power source, a wind power source, a hydropower source, or an energy storage device.

4. The method of claim 2, further comprising emulating the second converter and the asynchronous machine as a second virtual synchronous machine connected in parallel to the first virtual synchronous machine.

5. The method of claim 4, wherein coordinating the operation of the first virtual synchronous machine and the second converter using the vector-control approach to control at least one of the voltage and the frequency at the point of interconnection between the inverter-based resource and the power grid in the closed loop manner further comprises:

incorporating a droop characteristic into voltage and frequency control loops of the first and second converters to coordinate operation of the first and second virtual synchronous machines using the vector-control approach to control at least one of the voltage and the frequency at the point of interconnection between the inverter-based resource and the power grid in the closed loop manner.

6. The method of claim 1, wherein the at least one additional device comprises a reactive power compensation device.

7. The method of claim 6, wherein emulating at least one of the at least one additional device or the first converter as the first virtual synchronous machine further comprises emulating the reactive power compensation device as the first virtual synchronous machine, the first virtual synchronous machine being a vector-control-based synchronous machine.

8. The method of claim 6, wherein the reactive power compensation device comprises at least one storage device.

9. The method of claim 6, wherein the reactive power compensation device is absent of storage.

10. The method of claim 1, further comprising:
receiving, via the controller, at least one of a frequency reference command or a voltage reference command from an external controller;
determining, via the controller, at least one power reference signal for the inverter-based resource based on at least one of the frequency reference command or the voltage reference command;
generating, via the controller, at least one current vector using the at least one power reference signal;
determining, via the controller, one or more voltage control commands for the inverter-based resource using the at least one current vector; and
controlling, via the controller, the inverter-based resource based on the one or more voltage control commands such that the inverter-based resource actively participates in controlling at least one of the voltage and the frequency at the point of interconnection between the inverter-based resource and the power grid in the closed loop manner.

11. The method of claim 1, wherein the asynchronous machine comprises a doubly-fed induction generator and the inverter-based resource comprises a wind turbine power system.

12. The method of claim 10, wherein the first converter comprises a line-side converter and the second converter comprises a rotor-side converter of the wind turbine power system.

13. The method of claim 10, wherein the controller comprises at least one of a turbine controller or a converter controller of the wind turbine power system.

14. The method of claim 1, wherein the at least one additional device comprises a reactive power compensation device, wherein emulating at least one of the at least one additional device or the first converter as the first virtual synchronous machine further comprises emulating the reactive power compensation device as the first virtual synchronous machine, the first virtual synchronous machine being a vector-control-based synchronous machine.

15. An inverter-based resource connected to a power grid, the inverter-based resource comprising:
an asynchronous machine;
a first converter;
a second converter;
at least one additional device coupled to terminals of the first converter; and
at least one controller for controlling the inverter-based resource to provide grid-forming control thereof, the controller comprising at least one processor, the at least one processor configured to perform a plurality of operations, the plurality of operations comprising:
emulating at least one of the at least one additional device or the first converter as a first virtual synchronous machine; and
coordinating operation of the first virtual synchronous machine and the second converter using a vector-control approach to control at least one of voltage and frequency at a point of interconnection between the at least one inverter-based resource and the power grid in a closed loop manner.

16. The inverter-based resource of claim 15, wherein the at least one additional device comprises a storage device.

17. The inverter-based resource of claim 15, wherein the at least one additional device comprises an additional hybrid power source, the hybrid power source comprising at least one of a solar power source, a wind power source, a hydropower source, or an energy storage device.

18. The inverter-based resource of claim 16, wherein the plurality of operations further comprises emulating the second converter and the asynchronous machine as a second virtual synchronous machine connected in parallel to the first virtual synchronous machine.

19. The inverter-based resource of claim 18, wherein coordinating the operation of the first virtual synchronous machine and the second converter using the vector-control approach to control at least one of the voltage and the frequency at the point of interconnection between the at least one inverter-based resource and the power grid in the closed loop manner further comprises:

incorporating a droop characteristic into voltage and frequency control loops of the first and second converters to coordinate operation of the first and second virtual synchronous machines using the vector-control approach to control at least one of the voltage and the frequency at the point of interconnection between the at least one inverter-based resource and the power grid in the closed loop manner.

20. A wind turbine power system connected to a power grid, the wind turbine power system comprising:
- a power converter comprising a rotor-side converter and a line-side converter;
- a doubly-fed induction generator;
- at least one additional device coupled to terminals of the line-side converter; and
- at least one controller for controlling the wind turbine power system to provide grid-forming control thereof, the controller comprising at least one processor, the at least one processor configured to perform a plurality of operations, the plurality of operations comprising:
  - emulating at least one of the at least one additional device or the line-side converter as a first virtual synchronous machine; and
  - coordinating operation of the first virtual synchronous machine and the rotor-side converter using a vector-control approach to control at least one of voltage and frequency at a point of interconnection between the wind turbine power system and the power grid in a closed loop manner.

* * * * *